United States Patent [19]

Sasaki et al.

[11] Patent Number: 4,707,526
[45] Date of Patent: Nov. 17, 1987

[54] TACKIFIER COMPOSITION

[75] Inventors: Makoto Sasaki, Yokohama; Masaki Yamakawa, Zama; Toshifumi Hirose; Katsuhiko Isayama, both of Kobe, all of Japan

[73] Assignees: Nippon Oil Co., Ltd., Minato; Kanegafuchi Kagaku Kogyo Kabushiki Kaisha, Osaka, both of Japan

[21] Appl. No.: 29,612

[22] Filed: Mar. 24, 1987

[30] Foreign Application Priority Data

Mar. 25, 1986 [JP] Japan .................................. 61-64897

[51] Int. Cl.$^4$ ............................................. C08G 65/48
[52] U.S. Cl. .................... 525/404; 525/534; 528/205
[58] Field of Search ................. 525/404, 534; 528/205

[56] References Cited

U.S. PATENT DOCUMENTS

| | | | |
|---|---|---|---|
| 3,280,160 | 10/1966 | Bailey | 525/404 |
| 3,478,075 | 11/1969 | Jack | 525/404 |
| 4,039,724 | 8/1977 | Gobran | 525/534 |
| 4,242,475 | 12/1980 | Tsuchiya | 525/534 |
| 4,302,571 | 11/1981 | Arai | 525/404 |
| 4,471,106 | 9/1984 | Luecke | 528/205 |

Primary Examiner—Paul R. Michl

Attorney, Agent, or Firm—Bucknam and Archer

[57] ABSTRACT

A tackifier composition comprising, as essential compontents, (a) 100 parts by weight of a polyether having at least one reactive silicon group;

(b) from 10 to 140 parts by weight of a phenolic hydroxyl group-containing cyclopentadiene resin which is obtained by copolymerization of 100 parts by weight of at least one component A selected from the group consisting of five-membered ring compounds of the following general formula having conjugated double bonds, and Diels-Alder reaction adducts thereof,

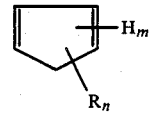

in which H is a hydrogen atom, R is an alkyl group having from 1 to 3 carbon atoms, and m and n are each an integer of 0 or at least 1 provided that m+n=6, with 5 to 200 parts by weight of at least one component B selected from the group consisting of monohydric and polyhydric phenols and alkyl-substituted products thereof; and (c) from 0.1 to 10 parts by weight of a curing catalyst.

7 Claims, No Drawings

TACKIFIER COMPOSITION

BACKGROUND OF THE INVENTION

Field of the Invention

This invention relates to a tackifier composition and more particularly to a novel reaction curable tackifier composition which comprises a cyclopentadiene resin having phenolic hydroxyl groups mixed in a polyether having at least one reactive silicon group. The novel tackifier compositions of the invention after cured are well-balanced especially in tack, stickiness and holding power and has excellent tack at low temperatures with excellent holding power at high temperatures. In addition, the cured tackifier composition is satisfactory in removability, adhesion to non-polar adherend, and weatherability, thus being very suitable for use as a tackifier.

Description of the Prior Art

The most popular conventional method of making tackifying articles is one which comprises adding a tack-providing resin, a plasticizer, an anti oxidant and the like to natural rubber or a synthetic rubber, uniformly dissolving the resulting mixture in an organic solvent to obtain a solution (having a solids content of 20-35%), applying the thus obtained solution or a solution of an acrylic type polymer onto support such as paper or a plastics film and then thermally drying the solution-applied support for removal of the solvent by evaporation, thereby obtaining the tackifying articles. However, the above method is disadvantageous in that a large amount of the organic solvent has to be removed, so that great expenses are necessary for heat energy required for evaportion of the solvent and also for an equipment of recovering the solvent, accompanied with further problems with respect to working environments, the prevention of disasters and public nuisance.

In order to solve these problems, there have been proposed solvent-free tackifiers including acrylic emulsion tackifiers and hot melt tackifiers. However, the former have the drawbacks of low water resistance and the emission of an objectionable acrylic odor. The latter are poor in heat resistance and tack. Thus, neither of them are satisfactory for practical applications.

Among known solvent-type tackifiers, rubber type tackifiers are unsatisfactory in holding power at high temperatures, and acrylic type tackifiers are not satisfctory in tack at low temperatures.

In order to overcome the drawbacks of the existing tackifiers, Japanese Patent Application Laid-Open Gazette No. 60-219280 describes a reaction curable tackifier composition obtained by adding a tack-providing resin, such as a petroleum resin, to a polyether containing at least one reactive silicon group. This tackifier composition has fluidity at room temperature and, when subjected to thermal treatment or the like, it is able to convert into a rubber-like material through a crosslinking reaction of the reactive silicon groups. Accordingly, the composition can be applied using little or no solvent, is odorless and has good heat and water resistances when cured. In addition, when cured, the composition will exhibit good tack at low temperatures and good holding power at high temperatures along with a good removability and good adhesion to non-polar adherends.

However, the above cured composition is poor in weatherability. When, for example, a tape to which such a tackifier composition has been applied is attached to a substance and peeled therefrom after passage of a long time, a portion of the composition uncured will be found to remain on the substance.

SUMMARY OF THE INVENTION

The principal object of the invention is to provide a tackifier composition which has not only the advantages of the known tackifier composition comprised mainly of a polyether containing at least one reactive silicon group, but also improved weatherability.

The present inventors made intensive studies in attempts to improve a tackifier composition, such as the above, comprised mainly of a polyether containing at least one reactive silicon group, and, as a result of their studies, they found that when a cyclopentadiene resin containing phenolic hydroxyl groups is added to the polyether having at least one reactive silicon group, the resultant composition will have fluidity at room temperature and good tack characteristics and will exhibit highly improved weatherability when cured. The present invention is accomplished based on the above finding or discovery.

The above object of the invention can be attained by the provision of a tackifier composition which comprises:

(a) 100 parts by weight of a polyether having at least one reactive silicon group;

(b) 10 to 140 parts by weight of a phenolic hydroxyl group-containing cyclopentadiene resin which is obtained by copolymerization of 100 parts by weight of at least one component A selected from the group consisting of five-membered ring compounds of the following general formula having conjugated double bonds, and Diels-Alder reaction adducts thereof,

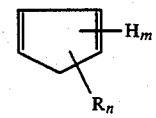

in which H is a hydrogen atom, R is an alkyl group having from 1 to 3 carbon atoms, and m and n are each an integer of 0 or at least 1 with the proviso that $m+n=6$, with 5 to 200 parts by weight of at least one component B selected from the group consisting of monohydric and polyhydric phenols and alkyl-substituted products thereof; and (c) from 0.1 to 10 parts by weight of a curing catalyst.

Further objects and advantages of the invention will be apparent from the following description of the invention.

DETAILED DESCRIPTION OF THE INVENTION

The polyether having at least one reactive silicon group used in the invention should have at least one reactive silicon group at an end of the molecule or at a side chain. Preferably, the silicon group should be at the end of the molecule since better tack characteristics are resulted therefrom. The reactive silicon group may be a group of the following general formula

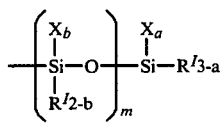

in which $X_a$ and $X_b$ are each a hydroxyl group or a hydrolyzable group which may be the same as or different from each other, each $R^I$ is a monovalent hydrocarbon group hving from 1 to 20 carbon atoms or a triorganosiloxy group and and the two $R^I$s may be the same as or different from each other, a is an integer of from 0 to 3 and b is an integer of from 0 to 2 provided that the total of a and b is in the range of from 1 to 4 (that is, $1 \leq a+b \leq 4$), and m is an integer of from 0 to 18. As defined above, each X may be any hydrolyzable group as well as a hydroxyl group. The hydrolyzable groups include a halide group, hydride group, alkoxy group, acyloxy group, ketoxymate group, amino group, amido group, aminoxy group and alkenyloxy group, but they are not limited to those indicated above. Of these, an alkoxy group is preferred. The alkoxy groups include a methoxy group, ethoxy group, isopropoxy group, butoxy group and phenoxy group. Of these, a methoxy group is preferred. The most preferable reactive silicon group is an alkoxysilyl group.

The amount of the reactive silicon group is preferably not less than 755, more preferably not less than 80%, of the total number of end groups. The above range of amount of the reactive silicon group is advantageous in uniform dissolution of a large amount of a tack-providing resin in the polyether. This enables tack characteristics to be widely controlled and a curing rate to be enhanced, which is beneficial from the standpoint of productivity.

The main chain of the polyether used in the invention has substantially chemically bonded recurring units of the formula, $-R^{II}-O-$, in which $R^{II}$ is a divalent organic group. Most effectively, the major proportion of the divalent organic groups should be hydrocarbon groups having from 1 to 4 carbon atoms. The divalent organic groups represented by $R^{II}$ include

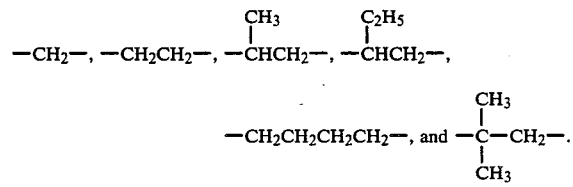

The polyether may contain one kind of recurring units but preferably contains two or more kinds of recurring units. A preferable group for the recurring units is

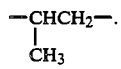

The polyether may have a linear main chain, a branched main chain or both linear and branched main chains. The molecular weight of the polyether is generally from 500 to 50,000, preferably from 2,000 to 20,000. The polyether used in the practice of the invention should most preferably be polypropylene oxide.

The polyethers containing reactive silicon groups may be prepared by any processes described, for example, in Japanese Patent Application Laid-Open Gazettes Nos. 53-129247, 54-6096, 54-6097, 55-82123, 55-123620, 55-137129, 55-135135, 55-125121, 59-74149, 59-78223 and 59-152923, and in Japanese Patent Publication Gazettes Nos. 45-36319, 46-12154, 46-30711 and 48-36960. However, the preparation is not limited only to these processes.

The cyclopentadiene resins containing a phenolic hydroxyl group, which are used as one of the components of the composition of the invention, are obtained by copolymerizing 100 parts by weight of a component A selected from five-membered ring compounds of the general formula having conjugated double bonds, Diels-Alder adducts thereof and their mixtures,

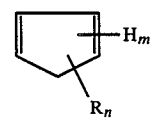

in which H is a hydrogen atom, R is an alkyl group having from 1 to 3 carbon atoms, and m and n are each an integer of 0 or at least 1 provided that $m+n=6$, with 5 to 200 parts by weight, preferably from 10 to 150 parts by weight, of at least one component B selected from monohydric and polyhydric phenols and alkyl-substituted compounds of these phenols. The copolymerization between the components A and B is effected at a reaction temperature of from 150° to 300° C., preferably from 200° to 280° C., for a time of from 10 minutes to 20 hours, preferably from 1 to 10 hours.

The copolymerization reaction between the components A and B may be carried out in 5 to 200 parts by weight of an aromatic hydrocarbon solvent, such as benzene, toluene or xylene, per 100 parts by weight of the total of the components A and B. After completion of the polymerization reaction, the solvent is removed from the reaction product in a usual manner. The unreacted monomers and low molecular weight products may be removed, if necessary.

In the preparation of the cyclopentadiene resin containing the phenolic hydroxyl groups used in the present invention, if the amount of the component B is less than 5 parts by weight per 100 parts by weight of the component A, the resulting final tackifier composition will not exhibit satisfactory weatherability after cured. With over 200 parts by weight of the component B, the resulting resin will be obtained in a very low yield and will have a lowered softening point. A tackifier composition containing the above resin will exhibit low holding power at high temperatures when cured.

Industrially, the component A is preferably cyclopentadiene, methycyclopentadiene, their Diels-Alder adduct such as dicyclopentadiene, a cyclopentadiene-methylcyclopentadiene co-dimer, tricyclopentadiene or a mixture thereof. Of these, cyclopentadiene, dicyclopentadiene and mixtures thereof are more preferred.

In the practice of this invention, cyclopentadiene, dicyclopentadiene or alkyl-substituted derivatives thereof should not always be required to be highly pure, but it is preferred that cyclopentadiene, dicyclopentadiene or alkyl-substituted derivatives thereof be at least 80% pure. Cyclopentadiene and methylcyclopentadiene contained in a $C_5$ fraction, which is a by-product obtained by thermal cracking of naphtha or the like at high temperatures, are thermally dimerized to obtain a mixture of dicyclopentadiene, dimethylcyclopentadiene, cyclopentadiene-methylcyclopentadiene co-dimer, cyclopentadiene-isoprene co-dimer, cyclopentadiene-piperylene and the like, followed by distillation to remove the greater part of $C_5$ components, such as $C_5$ olefins and $C_5$ paraffins from the thus obtained mixture, thereby obtaining a concentrated fraction. The thus obtained fraction may also be used as the component A.

As stated before, the component B is at least one member selected from monohydric and polyhydric phenols and alkyl-substituted derivatives thereof. The alkyl-substituted derivatives have preferably 1 to 3 alkyl substituents each having from 1 to 12 carbon atoms. The component B includes monohydric phenols such as phenol, cresol, ethylphenol, propylphenol, butylphenol, tert.-butylphenol, amylphenol, hexylphenol, octylphenol, nonylphenol nd dodecylphenol, and polyhydric phenols such as hydroquinone, resorcin, catechol and bisphenol.

For the preparation of the cyclopentadiene resin containing the phenolic hydroxyl group, unsaturated components and particularly, unsaturated aromatic components, in petroleum fractions may be used in an amount not larger than the amount of the component A. For instance, styrene, alpha-methylstyrene, vinyltoluene, indene, metylindene and mixtures thereof may be used. In an industrial sense, a $C_9$ fraction which is secondarily product upon cracking of naphtha is preferably used.

In order to improve the hue or remove the objectionable odor of the cyclopentadiene resin, it may be hydrogenated.

Since the phenolic hydroxyl group-containing cyclopentadiene resin is used as a tackifier resin, it is preferred that the softening point as measured by a ring and ball method prescribed in JIS K2531-60 be in the range of from 60° to 150° C.

The amount of the cyclopentadiene resin per 100 parts by weight of the polyether is generally in the range of from 10 to 140 parts by weight, preferably from 20 to 120 parts by weight. With less than 10 parts by weight of the cyclopentadiene resin, the resulting tackifier composition will be unsatisfactory in stickiness when cured, whereas with over 140 parts by weight of the cyclopentadiene resin, the resulting tackifier composition will be deficient in tack when cured.

Any known tackifier resins compatible with the polyether may be used in amounts not larger than the amount of the cyclopentadiene resin containing phenolic hydroxyl groups provided that the total amount of these tackifier resins is not larger than 140 parts by weight per 100 parts by weight of the polyether.

In the practice of the invention, curing catalysts are used so as to facilitate the curing reaction by condensation of the reactive silicon groups of the polyether. The curing catalysts include titanic acid esters such as tetrabutyl titanate and tetrapropyl titanate; tin carboxylates such as dibutyl tin dilaurate, dibutyl tin maleate, dibutyl tin diacetate, tin octylate and tin naphthenate; reaction products of dibutyl tin oxide and phthalic esters; dibutyl tin diacetylacetonate; organic aluminium compounds such as aluminium trisacetylacetonate, aluminium trisethylacetoacetate and diisopropoxy aluminium ethylacetoacetate; chelated compounds such as zirconium tetraacetylacetonate and titanium tetraacetylacetonate; lead octylate; amine compounds such as butylamine, monoethanolamine, triethylenetriamine, guanidine, 2-ethyl-4-methylimidazole, 1,3-diazabicyclo(5,4,6)undecene-7 (DBU), and their salts with carboxylic acids; and known silanol catalysts such as other acid catalysts and basic catalysts. The amount of these catalysts is generally in the range of from 0.1 to 10 parts by weight per 100 parts by weight of the polyether containing at least one reactive silicon group. Amount less than 0.1 parts by weight of the catalyst are unfavorable because of a reduced effect of the catalyst. With over 10 parts by weight of the catalyst, curing of the tackifier composition takes place too quickly, so that an adverse influence on working properties is produced when the tackifier composition is coated on a support.

If necessary, various additives may be added in the practice of the invention, including plasticizers or softening agents such as dioctyl phthalate, butylbenzyl phthalate, polypropylene glycol, chlorinated paraffin and liquid polybutadiene; fillers such as calcium carbonate, clay, talc, titanium oxide, zinc oxide, silica, diatomaceous earth and barium sulfate; and antioxidants, UV absorbers, pigments, surface active agents and silicone compounds. The silicone compounds include various silane coupling agents. Examples of such coupling agents include alkylalkoxysilanes such as methyltrimethoxysilane, dimethyldimethoxysilane, trimethylmethoxysilane and n-propyltrimethoxysilane; alkylisopropenoxysilanes such as dimethyldiisopropenoxysilane, methyltriisopropenoxysilane, and gamma-glycidoxypropylmethylidiisopropenoxysilane; alkoxysilanes having functional groups such as gamma-glycidoxypropylmethyldimethoxysilane, gamma-glycidoxypropyltrimethoxysilane, vinyltrimethoxysilane, vinyldimethylmethoxysilane, gamma-aminopropyltrimethoxysilane, N-(beta-aminoethyl)aminopropylmethyldimethoxysilane, gamma-mercaptopropyltrimethoxysilane and gamma-mercaptopropylmethyldimethoxysilane; polysiloxanes; silanol compounds such as trimethylsilanol, triethylsilanol, triphenylsilanol, diphenylmethylsilanol, phenyldimethylsilanol and diphenylsilanediol; hexamethyldisilazane; and ethyl silicate. The amount of these additives is in the range of from 0 to 150 parts by weight, preferably from 0 to 100 parts by weight, per 100 parts by weight of the polyether having at least one reactive silicon group.

The tackifier composition of the invention is different from known solvent-type compositions using large amounts of organic solvents and is of the type which is substantially free of any solvent or contains little solvent. Accordingly, the dissolution of the tackifier resin (i.e. the cyclopentadiene resin containing phenolic hydroxyl groups) in the polymer ingredient (i.e. the polyether) may be effected by dissolving the cyclopentadiene resin in a solvent and then mixing the dissolved cyclopentadiene with the polyether. Alternatively, a mixture of the cyclopentadiene and the polyether may be heated to a temperature near a softening point of the cyclopentadiene or may be mixed with a kneader or rolls, thereby obtaining a completely solvent-free tackifier composition.

Although the composition of the invention is substantially free of any solvent, a small amount of a solvent may be added in order to control the viscosity.

The tackifier composition may be used to make tackifier articles according to the following methods. It will be noted these methods are illustrated on by way of examples, not for the purpose of limitations.

In one instance, a cyclopentadiene resin containing phenolic hydroxyl groups and, if necessary, plasticizers, fillers and antioxidants in given amounts are added to a liquid polyether having at least one hydrolyzable silicon group, followed by uniform dissolution by means of a kneading apparatus such as a Banbury mixer, a kneader or rolls. Finally, a curing catalyst is uniformly mixed to obtain a liquid composition. This liquid composition is applied onto a support in a given thickness by the use of a coater and convolutely wound. For the production on a large scale, a catalyst may be separately applied onto a support from the standpoint that the viscosity of a tackifier composition is kept stabilized. Alternatively, after application of a tackifier composition to a support, a catalyst or water may be sprayed over the tackifier composition-applied support by the use of a spray.

At an initial stage, the tackifier composition of the invention is fluid in spite of the fact that it is free of solvent, or a solvent is used only in a small amount, and can be readily applied onto a support such as of paper or plastics. Upon heating of the tackifier composition of the invention, the reactive silicon groups in the polyether react with one another to form intramolecular crosslinkage, this leading increase in the molecular weight of the polyether. As a result, the composition loses the fluidity at the initial stage and converted into a rubber-like material, thus being useful as a solvent-free tackifier. Since the tackifier composition of the invention comprises the cyclopentadiene resin containing phenolic hydroxyl groups as the tackifier resin, good tack characteristics such as good tack even at low temperature sand good holding power particularly at high temperatures are ensured. In addition since the cyclopentadiene resin is used as the tackifier resin, the resulting tackifier composition after cured exhibits a better weatherability than in the case using other types of known tackifier resins. In this sense, the tackifier composition of the invention is particularly useful for tackifier articles for refrigeration or for use in cold districts in which good tack characteristics at low temperatures are required, or tackifier articles for hooks in which a high holding power is required. Because of the good weatherability and the good removability, the composition is particularly suitable for masking and surface-protecting tapes or sheets. Moreover, the tackifier compositon after cured has a high wettability on and a high force of adhesion to non-polar substances, and is thus useful for adhesion to materials such as polyethylene and polypropylene. Needless to say, the tackifier composition of the invention is also suitably applied as highly adhesive, double-sided tapes or labels.

The present invention will be more particularly described by way of examples, which should not be construed as limiting the present invention.

SYNTHETIC EXAMPLE 1

409 g of dicyclopentadiene having a purity of 96%, 291 g of phenol and 300 g of mixed xylene were heated for reaction at 265° C. for 6 hours while agitating in an autoclave. After completion of the reaction, the autoclave was cooled, after which the content was distilled to remove unreacted monomers, lower molecular weight polymers, and the xylene. 521 g of resin I was obtained as a still residue. The resin I had a softening point of 104.5° C. and a hydroxyl value of 137 mg KOH/g.

SYNTHETIC EXAMPLE 2

The general procedure of Synthetic Example 1 was repeated using 459 g of dicyclopentadiene having a purity of 96% and 541 g of mixed cresol, thereby obtaining 722 g of resin II. The resin II had a softening point of 91° C. and a hydroxyl value of 151 mg KOH/g.

SYNTHETIC EXAMPLE 3

The general procedure of Synthetic Example 1 was repeated except that 503 g of dicyclopentadiene having a purity of 96%, 197 g of mixed cresol and 300 g of mixed xylene were subjected to thermal reaction at 265° C. for 2 hours in an autoclave, thereby obtaining 509 g of resin III. The resin III had a softening point of 105.5° C. and a hydroxyl value of 81.5 mg KOH/g.

SYNTHETIC EXAMPLE 4

A $C_5$ cracked fraction (boiling point: 28° to 60° C.) obtained as secondarily product during preparation of ethylene and propylene by steam cracking of naphtha, was distilled at 120° C. for 4 hours to remove the $C_5$ fraction, thereby obtaining a residue containing 85% of dicyclopentadiene and 15% of a co-dimer of cyclopentadiene, isoprene or piperine. 332 g of the residue containing 85% of the dicyclopentadiene, 378 g of mixed cresol and 300 g of mixed xylene were subjected to thermal reaction at 280° C. for 8 hours in an autoclave, followed by repeating the procedure of Synthetic Example 1, thereby obtaining 480 g of resin IV. The resin IV had a softening point of 91° C. and a hydroxyl value of 151 mg KOH/g.

SYNTHETIC EXAMPLE 5

439 g of dicyclopentadiene having a purity of 96%, 124 g of an aromatic fraction formed by thermal cracking of naphtha and having a boiling point of 140° to 280° C., 199 g of phenol and 238 g of mixed xylene were subjected to thermal reaction at 270° C. for 8 hours in an autoclave, followed by repeating the procedure of Synthetic Example 1 to obtain 597 g of resin V. The resin V had a softening point of 140° C. and a hydroxyl group of 92.4 mg KOH/g.

REFERENCE FOR SYNTHESIS 800 g of polypropylene oxide (prepared from starting polypropylene glycol) having 97% of an allyl ether group based on the total end groups and having an average molecular weight of 8000 was charged into an autoclave equipped with an agitator, to which 20 g of methyldimethoxysilane was added. Thereafter, 0.3 ml of a catalyst solution of chloroplatinic acid (obtained by dissolving 8.9 g of $H_2PtCl_6 \cdot 6H_2O$ in 18 ml of isopropyl alcohol and 160 ml of tetrahydrofuran) was added to the mixture, followed by reaction at 80° C. for 6 hours. The reaction conversion was quantitatively determined by the gas chromatography and Ir spectroscopy, revealing that 83% of the total end groups took part in the reaction. As a result, polypropylene oxide having end groups of the following formula was obtained

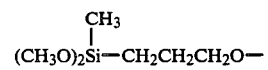

100 parts by weight of the hydrolyzable silicon-containing polyether (average molecular weight: 8200) obtained in this reference was uniformly mixed with and dissolved in 100 parts by weight of the phenolic hydroxyl group-containing cyclopentadiene obtained in Synthetic Examples 1 to 5 and 133 parts by weight of toluene. A curing catalyst was added to the resultant uniform solution, which wa sthinly applied onto a glass plate and the toluene was removed by evaporation. The compatibility and adhesion property of each composition were evaluated in terms of milky-turbidity and finger tack, respectively. The results are shown in Table 1. In Table 1, the compatibility and tack property are, respectively, evaluated according to the following standards.

Compatibility:
o=uniformly transparent,
Δ=somewhat milky-turbid, and
x=milky turbid.

Tack property (finger tack):
o=greatly sticky,
Δ=slightly sticky, and
x=not sticky.

TABLE 1

| Resin | Compatibility | Tack Property |
|---|---|---|
| resin I | o | o |
| resin II | o | o |
| resin III | o | o |
| resin IV | o | o |
| resin V | o | o |

EXAMPLES 1 TO 5

100 parts by weight of the silyl-terminated polyether obtained in the reference was mixed with 80 parts by weight of each of the phenolic hydroxyl group-containing cyclopentadiene resins obtained in Synthetic Examples 1 to 5 and a small amount of toluene to obtain high solid solutions having a solid content of 805 and a viscosity of 20 to 60 poises (as determined by the Brookfield viscometer). A tin compound (commercial name of No. 918, made by Sankyo Organic Chemicals Co., Ltd.) used as a curing catalyst was added in an amount of 5 parts by weight, based on the polyether, and uniformly mixed, which was applied onto a 25 micrometer thick polyester film by means of a coater in a dry thickness of 25 micrometers, followed by curing at 120° C. for 2 to 10 minutes.

The resulting tackifier tapes were each subjected to measurements of tack characteristics (a balance of a tack, an adhesive strength and a holding power, a removability, and an adhesive strength to a non-polar substance) and weatherability.

COMPARATIVE EXAMPLE 1

The silyl-terminated polyester obtained in the reference was cured without addition of the phenolic hydroxyl group-containing cyclopentadiene resin and subjected to measurements of the tack characteristics. The results are shown in Table 2.

COMPARATIVE EXAMPLES 2 TO 5

The general procedure of Examples 1 to 5 was repeated except that various types of tackifier resin compatible with the silyl terminated polyether were used instead of the phenolic hydroxyl group-containing cyclopentadiene resin, thereby making tapes for measuring the tack characteristics and weatherability. The types of tackifiers and the results are shown in Table 2.

COMPARATIVE EXAMPLES 6 AND 7

A kraft tackifier tape having a coating thickness of 25 micrometers which is typical of a rubber tackifier tape and a polyester tackifier tape having a coating thickness of 25 micrometers which is typical of an acrylic tackifier tape were subjected to measurements of the tack characteristics with the results shown in Table 2.

The respective test methods are as follows.

(a) Tack:
Measured by the J. Dow ball tack method. Each of the values in Table 2 is a maximum diameter ($\times 1/32$ inches) of a ball which stopped when the test was conducted under conditions of an approach length of 10 cm, an angle of inclination of 30° and a temperature of 23° C. or 0° C.

(b) Adhesive strength:
A test tape was attached to a stainless steel plate and allowed to stand at 23° C. for 60 minutes, and a 180° peeling strength was measured at a pulling rate of 300 mm/minute. A similar measurement was repeated with respect to a polyethylene plate and a polypropylene plate.

(c) Holding power:
Measured in accordance with JIS Z 0237. A test tape was attached to a stainless steel plate in such a way that the bonded area was 25 mm×25 mm. The stainless steel plates was suspended vertically at one end and a weight of 1 kG was vertically suspended from the free end of the test tape so that the static load was imposed on the bonded area. 60 minutes after the suspension, a length of slippage was measured. This test ws effected at 40° C.

(d) Weatherability:
A test tape was attached to a stainless steel plate and subjected to a weatherability test using the super long life sunshine weather-O-meter at a panel temperature of 63° C. in such a way that water was sprayed for 18 minutes in one cycle of 120 minutes. The weatherability was measured after 300 hours. Each of the values in Table 2 is a percent rate of an adhesive left on the stainless steel plate when peeled at a temperature of 23° C. at a pulling rate of 300 mm/minute.

(e) Removability:
A test tape was attached to a stainless steel plate, allowed to stand at 65° C. for 72 hours and 144 hours, and returned to room temperature, followed by measurement of an adhesive strength.

TABLE 2

| | | | Tack | | Adhesive Strength (g/cm) | | | Holding Power (mm) | Weather-ability (%) | Removability (g/cm) | |
|---|---|---|---|---|---|---|---|---|---|---|---|
| | Rubber Component | Resin | 23° C. | 0° C. | Stainless Steel Plate | Poly-ethylene Plate | Poly-propylene Plate | | | 72 hrs. | 144 hrs. |
| Example: | | | | | | | | | | | |
| 1 | polyether of reference | resin I | 22 | 7 | 440 | 265 | 385 | 0 | 0 | 455 | 450 |

TABLE 2-continued

| | Rubber Component | Resin | Tack 23° C. | Tack 0° C. | Adhesive Strength (g/cm) Stainless Steel Plate | Adhesive Strength (g/cm) Polyethylene Plate | Adhesive Strength (g/cm) Polypropylene Plate | Holding Power (mm) | Weatherability (%) | Removability (g/cm) 72 hrs. | Removability (g/cm) 144 hrs. |
|---|---|---|---|---|---|---|---|---|---|---|---|
| 2 | polyether of reference | resin II | 21 | 4 | 320 | — | — | 0 | 0 | — | — |
| 3 | polyether of reference | resin III | 25 | 4 | 350 | — | — | 0 | 0 | — | — |
| 4 | polyether of reference | resin IV | 25 | 7 | 370 | 250 | 370 | 0 | 0 | 380 | 380 |
| 5 | polyether of reference | resin V | 12 | 2 | 480 | — | — | 0 | 0 | — | — |
| Comparative Example: | | | | | | | | | | | |
| 1 | polyether of reference | — | 6 | — | 5 | — | — | 0 | — | — | — |
| 2 | polyether of reference | comparative resin A*1 | 32< | — | 230 | — | — | 0 | 40 | — | — |
| 3 | polyether of reference | comparative resin B*2 | 17 | 4 | 325 | — | — | 0 | 50 | — | — |
| 4 | polyether of reference | comparative resin C*3 | 25 | <2 | 350 | 220 | 365 | 0 | 60 | 370 | 360 |
| 5 | polyether of reference | comparative resin D*4 | 27 | 7 | 125 | — | — | 0 | 50 | — | — |
| 6 | rubber tackifier tape | | 17 | <2 | 330 | — | — | 5.5 | — | 500 | 540 |
| 7 | acrylic resin tackifier tape | | 7 | <2 | 420 | 135 | 240 | 0 | — | 590 | 640 |

*1: Aromatic petroleum resin "Petrosin 80", made by Mitsui Petrochemical Co., Ltd.
*2: Alicyclic petroleum resin "Quintone 1500", made by Nippon Zeon Co., Ltd.
*3: Terpene-phenolic resin "YS Polyester T-115", made by Yasuhara Oils and Fats Co., Ltd.
*4: Low molecular weight polystyrene resin "Picolastic A75", made by Hercules Inc.

As will be seen from Table 2, the solvent-free tackifier composition of the invention which comprises a polyether having at least one reactive silicon group and a cyclopentadiene resin containing phenolic hydroxyl groups have better tack characteristics (balanced tack, adhesive strength and holding power, removability and adhesion force to non-polar substances) than known rubber and acrylic resin tackifier. Since the phenolic hydroxyl group-containing cyclopentadiene resin is used as a tackifier resin, a significantly better weatherability is attained which is not satisfactory when using other types of tackifier resin.

What is claimed is:

1. A tackifier composition which comprises:
   (a) 100 parts by weight of a polyether having at least one reactive silicon group;
   (b) 10 to 140 parts by weight of a phenolic hydroxyl group-containing cyclopentadiene resin which is obtained by copolymerization of 100 parts by weight of at least one component A selected from the group consisting of five-membered ring compounds of the following general formula having conjugated double bonds, and Diels-Alder reaction adducts thereof,

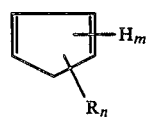

in which H is a hydrogen atom, R is an alkyl group having from 1 to 3 carbon atoms, and m and n are each an integer of 0 or at least 1 provided that m+n=6, with 5 to 200 parts by weight of at least one component B selected from the group consisting of monohydric and polyhydric phenols and alkyl-substituted products thereof; and
   (c) from 0.1 to 10 parts by weight of a curing catalyst.

2. A tackifier composition according to claim 1, wherein said component A is cyclopentadiene, methyl cyclopentadiene, dicyclopentadiene, cyclopentadiene-methyl cyclopentadiene co-dimer, tricyclopentadiene or a mixture thereof.

3. A tackifier composition according to claim 1, wherein said component B is phenol, cresol, ethylphenol, propylphenol, butylphenol, tert.-butylphenol, amylphenol, hexylphenol, octylphenol, nonylphenol, dodecylphenol, hydroquinone, resorcinol, catechol or bisphenol.

4. A tackifier composition according to claim 1, wherein the copolymerization between said component A and said component B is effected at 150° to 300° C. for 10 minutes to 20 hours.

5. A tackifier composition according to claim 1, wherein said reactive silicon group is an alkoxysilyl group.

6. A tackifier composition according to claim 1, wherein said polyether is polypropylene oxide.

7. A tackifier composition according to claim 1, wherein said curing catalyst is tetrabutyl titanate, tetrapropyl titanate, dibutyl tin dilaurate, dibutyl tin maleate, dibutyl tin diacetate, tin octinate, tin naphthenate, a reaction product of dibutyl tin oxide and a phthalic ester, dibutyl tin diacetylacetonate, aluminium trisacetylacetonate, diisopropoxy aluminium ethylacetoacetate, zirconium tetracetylacetonate, titanium tetraacetylacetonate, lead octinate, butylamine, monoethanolamine, triethylenetriamine, guanidine, 2-ethyl-4-methylimidazole, 1,3-diazabicyclo(5,4,6)undecene-7 (DBU) or a catalyst for condensing a silanol.

* * * * *